US007576329B2

(12) United States Patent
Srivastava et al.

(10) Patent No.: US 7,576,329 B2
(45) Date of Patent: Aug. 18, 2009

(54) SCINTILLATOR COMPOSITIONS, AND RELATED PROCESSES AND ARTICLES OF MANUFACTURE

(75) Inventors: Alok Mani Srivastava, Niskayuna, NY (US); Steven Jude Duclos, Clifton Park, NY (US); Lucas Lemar Clarke, Uniontown, OH (US); Holly Ann Comanzo, Niskayuna, NY (US); Qun Deng, Shanghai (CN)

(73) Assignee: General Electric Company, Niskayuna, NY (US)

( * ) Notice: Subject to any disclaimer, the term of this patent is extended or adjusted under 35 U.S.C. 154(b) by 312 days.

(21) Appl. No.: 11/316,305

(22) Filed: Dec. 20, 2005

(65) Prior Publication Data

US 2006/0237654 A1    Oct. 26, 2006

Related U.S. Application Data

(63) Continuation-in-part of application No. 10/689,361, filed on Oct. 17, 2003, now Pat. No. 7,084,403.

(51) Int. Cl.
*G01T 1/20* (2006.01)
(52) U.S. Cl. .............................. 250/370.11; 250/361 R
(58) Field of Classification Search ............ 250/370.11, 250/361 R, 301.4 H; 252/301.4 H
See application file for complete search history.

(56) References Cited

U.S. PATENT DOCUMENTS

| | | | |
|---|---|---|---|
| 3,599,109 A | * | 8/1971 | Guggenheim et al. .......... 372/41 |
| 3,988,252 A | * | 10/1976 | Ferretti ................ 252/301.4 H |
| 4,510,394 A | | 4/1985 | Allemand et al. |
| 4,596,927 A | * | 6/1986 | Hopkinson et al. ....... 250/269.8 |
| 4,761,347 A | | 8/1988 | Nakamura |
| 5,015,860 A | * | 5/1991 | Moses .................... 250/361 R |
| 5,028,509 A | * | 7/1991 | Shimada et al. ............. 430/139 |

(Continued)

FOREIGN PATENT DOCUMENTS

EP    1739150    3/2007

(Continued)

OTHER PUBLICATIONS

Moses, William W., Scintillator Requirements for Medical Imaging, Lawrence Berkeley National Laboratory, University of California, Berkeley, CA 94720 USA.

(Continued)

*Primary Examiner*—David P Porta
*Assistant Examiner*—Faye Boosalis
(74) *Attorney, Agent, or Firm*—Francis T. Coppa

(57) ABSTRACT

Scintillator materials based on certain types of halide-lanthanide matrix materials are described. In one embodiment, the matrix material contains a mixture of lanthanide halides, i.e., a solid solution of at least two of the halides, such as lanthanum chloride and lanthanum bromide. In another embodiment, the matrix material is based on lanthanum iodide alone, which must be substantially free of lanthanum oxyiodide. The scintillator materials, which can be in monocrystalline or polycrystalline form, also include an activator for the matrix material, e.g., cerium. To further improve the stopping power and the scintillating efficiency of these halide scintillators, the addition of bismuth is disclosed. Radiation detectors that use the scintillators are also described, as are related methods for detecting high-energy radiation.

44 Claims, 2 Drawing Sheets

U.S. PATENT DOCUMENTS

| | | |
|---|---|---|
| 5,039,858 A | 8/1991 | Anderson et al. |
| 5,134,293 A | 7/1992 | Anderson et al. |
| 5,168,540 A | 12/1992 | Winn et al. |
| 5,213,712 A | 5/1993 | Dole |
| 5,319,203 A | 6/1994 | Anderson et al. |
| 5,453,623 A | 9/1995 | Wong et al. |
| 5,786,600 A | 7/1998 | Lambert et al. |
| 5,869,836 A | 2/1999 | Linden et al. |
| 5,882,547 A | 3/1999 | Lynch et al. |
| 6,093,347 A | 7/2000 | Lynch et al. |
| 6,246,744 B1 | 6/2001 | Duclos et al. |
| 6,278,832 B1 | 8/2001 | Zagumennyi et al. |
| 6,298,113 B1 | 10/2001 | Duclos et al. |
| 6,323,489 B1 | 11/2001 | McClellan |
| 6,358,441 B2 | 3/2002 | Duclos et al. |
| 6,362,479 B1 | 3/2002 | Andreaco et al. |
| 6,402,987 B1 | 6/2002 | Srivastava et al. |
| 6,437,336 B1 | 8/2002 | Pauwels et al. |
| 6,585,913 B2 | 7/2003 | Lyons et al. |
| 6,624,420 B1 | 9/2003 | Chai et al. |
| 6,624,422 B2 | 9/2003 | Williams et al. |
| 6,630,077 B2 | 10/2003 | Shiang et al. |
| 6,699,406 B2 | 3/2004 | Riman et al. |
| 6,911,251 B2 | 6/2005 | Duclos |
| 2002/0156279 A1 | 10/2002 | Boussie et al. |
| 2003/0211369 A1 | 11/2003 | Riman et al. |
| 2004/0238747 A1* | 12/2004 | Dorenbos et al. ....... 250/361 R |
| 2005/0082484 A1 | 4/2005 | Srivastava et al. |
| 2005/0104001 A1 | 5/2005 | Shah |
| 2005/0104002 A1 | 5/2005 | Shah |
| 2006/0104880 A1* | 5/2006 | Iltis ............................ 423/263 |

FOREIGN PATENT DOCUMENTS

| | | |
|---|---|---|
| WO | 016945 A2 | 8/2001 |
| WO | 0160944 A2 | 8/2001 |
| WO | WO 2004/109333 A1 | 12/2004 |

OTHER PUBLICATIONS

Kasap, Safa O.; Rowlands, John A., Direct-Conversion Flat-Panel X-Ray Image Sensors for Digital Radiography, Proceedings of the IEEE, vol. 90, No. 4, Apr. 2002.

Positron Emission Tomography (PET), A radiological technique for functional imaging, Stockholm Centre for Physics, Astronomy and Biotechniques (Alba Nova).

EP Search Report, EP06126459, Jan. 15, 2008.

Evd Van Loef et al., "Scintillator Properties of LaCl3:Ce3+ Crystals: Fast, Efficient, and High Energy Resolution Scintillators", IEEE Transactions on Nuclear Science, Jun. 2001, pp. 341-345, vol. 48, No. 3.

Evd Van Loef et al., "High Energy Resolution Scintillator: Ce3+ Activated LaCl3", Applied Physics Letters, Sep. 2000, pp. 1467-1468, vol., 77, No. 10.

Evd Van Loef et al., "High Energy Resolution Scintillator: Ce3+ Activated LaBr3", Applied Physics Letters, Sep. 2001, pp. 1573-1575, vol., 79, No. 10.

Moses, William W., Scintillator Requirements for Medical Imaging, Lawrence Berkeley National Laboratory, University of California, Berkeley, CA 94720 USA, Sep. 1999.

Kasap, Safa O.; Rowlands, John A., Direct-Conversion Flat-Panel X-Ray Image Sensors for Digital Radiography, Proceedings of the IEEE, vol. 90, No. 4, Apr. 2002.

* cited by examiner

SCINTILLATOR COMPOSITIONS, AND RELATED PROCESSES AND ARTICLES OF MANUFACTURE

CROSS REFERENCE TO RELATED APPLICATIONS

This application is a continuation-in-part and claims the benefit of the Oct. 17, 2003 filing date of U.S. patent application Ser. No. 10/689,361 now U.S. Pat. No. 7,084,403.

BACKGROUND OF THE INVENTION

In a general sense, this invention relates to materials and devices used in the detection of ionizing radiation. More specifically, it relates to scintillator compositions which are especially useful for detecting gamma-rays and X-rays under a variety of conditions.

Many techniques are available for detecting high-energy radiation. Scintillators are of special interest, in view of their simplicity and accuracy. Thus, scintillator crystals are widely used in detectors for gamma-rays, X-rays, cosmic rays, and particles characterized by an energy level of greater than about 1 keV. From such crystals, it is possible to manufacture detectors, in which the crystal is coupled with a light-detection means, i.e., a photodetector. When photons from a radionuclide source impact the crystal, the crystal emits light. The photodetector produces an electrical signal proportional to the number of light pulses received, and to their intensity. Scintillator crystals are in common use for many applications. Examples include medical imaging equipment, e.g., positron emission tomography (PET) devices; well-logging for the oil and gas industry, and various digital imaging applications.

As those skilled in the art understand, the composition of the scintillator is critical to the performance of the radiation detection equipment. The scintillator must be responsive to X-ray and gamma ray excitation. Moreover, the scintillator should possess a number of characteristics which enhance radiation detection. For example, most scintillator materials must possess high light output, short decay time, reduced afterglow, high "stopping power", and acceptable energy resolution. (Other properties can also be very significant, depending on how the scintillator is used, as mentioned below.)

Those skilled in the art are familiar with all of these properties. In brief, "light output" is the quantity of visible light emitted by the scintillator after being excited by a pulse of the x-ray or gamma ray. High light output is desirable because it enhances the radiation detector's ability to convert the light into an electric pulse. (The size of the pulse usually indicates the amount of radiation energy.)

The term "decay time" refers to the time required for the intensity of the light emitted by the scintillator to decrease to a specified fraction of the light intensity at the time when the radiation excitation ceases. For many applications, such as the PET devices, shorter decay times are preferred because they allow efficient coincidence-counting of gamma rays. Consequently, scan times are reduced, and the device can be used more efficiently.

"Stopping power" is the ability of a material to absorb radiation, and is sometimes referred to as the material's "X-ray absorption" or "X-ray attenuation". Stopping power is directly related to the density of the scintillator material. Scintillator materials which have high stopping power allow little or no radiation to pass through, and this is a distinct advantage in efficiently capturing the radiation.

The "energy resolution" of a radiation detector refers to its ability to distinguish between energy rays (e.g., gamma rays) having very similar energy levels. Energy resolution is usually reported as a percentage value, after measurements are taken at a standard radiation emission energy for a given energy source. Lower energy resolution values are very desirable, because they usually result in a higher quality radiation detector.

A variety of scintillator materials which possess most or all of these properties have been in use over the years. For example, thallium-activated sodium iodide (NaI(Tl)) has been widely employed as a scintillator for decades. Crystals of this type are relatively large and fairly inexpensive. Moreover, NaI(Tl) crystals are characterized by a very high light output.

Examples of other common scintillator materials include bismuth germanate (BGO), cerium-doped gadolinium orthosilicate (GSO), and cerium-doped lutetium orthosilicate (LSO). Each of these materials has some good properties which are very suitable for certain applications.

As those familiar with scintillator technology understand, all of the conventional materials possess one or more deficiencies, along with their attributes. For example, thallium-activated sodium iodide is a very soft, hygroscopic material, readily absorbing oxygen and moisture. Moreover, such a material produces a large and persistent after-glow, which can interfere with the intensity-counting system. Furthermore, the decay time of NaI(Tl), about 230 nanoseconds, is too slow for many applications. The thallium component may also require special handling procedures, in view of health and environmental issues.

BGO, on the other hand, is non-hygroscopic. However, the light yield of this material (15% of NaI(Tl)), is too low for many applications. The material also has a slow decay time. Moreover, it has a high refractive index, which results in light loss due to internal reflection.

While GSO crystals are suitable for some applications, their light yield is only about 20% of that obtained with NaI(Tl). Moreover, the crystals are easily-cleaved. It is therefore very difficult to cut and polish these crystals into any specific shape, without running the risk of fracturing the entire crystal.

The LSO materials also exhibit some drawbacks. For example, the lutetium element of the crystal contains a small amount of a natural, long-decay radioactive isotope, $Lu^{176}$. The presence of this isotope will provide a background count rate that can greatly interfere with highly-sensitive detector applications. Moreover, lutetium is very expensive, and has a relatively high melting point, which can sometimes make processing difficult.

Deficiencies of conventional scintillators have prompted the search for new materials. Some of the new materials are described in two published patent applications attributed to P. Dorenbos et al:, WO 01/60944 A2 and WO 01/60945 A2. The references describe the use of cerium-activated lanthanide-halide compounds as scintillators. The first-mentioned publication describes the use of Ce-activated lanthanide chloride compounds, while the second publication describes the use of Ce-activated lanthanide bromide compounds. The halide-containing materials are said to simultaneously provide a combination of good energy resolution and fast decay constant. Such a combination of properties can be very advantageous for some applications. Moreover, the materials apparently exhibit acceptable light output values. Furthermore, they are free of lutetium, and the problems sometimes caused by that element, described above. It should be noted that lanthanide halide materials have a relatively low density relative to other rare earth halide scintillator materials. For example, lanthanunum iodide has a density of 4 g/cc to 6 g/cc. Other rare earth metal halides may have densities ranging from 6 g/cc to 8 g/cc.

The Dorenbos publications certainly seem to represent an advance in scintillator technology. However, such an advance is made against a background of ever-increasing requirements for the crystals. One example of an end use which has rapidly become more demanding is well-logging, mentioned above. In brief, scintillator crystals (usually NaI(Tl)-based) are typically enclosed in tubes or casings, forming a crystal package. The package includes an associated photomultiplier tube, and is incorporated into a drilling tool which moves through a well bore.

The scintillation element functions by capturing radiation from the surrounding geological formation, and converting that energy into light. The generated light is transmitted to the photo-multiplier tube. The light impulses are transformed into electrical impulses. Data based on the impulses may be transmitted "up-hole" to analyzing equipment, or stored locally. It is now common practice to obtain and transmit such data while drilling, i.e., "measurements while drilling" (MWD).

One can readily understand that scintillator crystals used for such an application must be able to function at very high temperatures, as well as under harsh shock and vibration conditions. The scintillator material should therefore have a maximized combination of many of the properties discussed previously, e.g., high light output and energy resolution, as well as fast decay times. (The scintillator must also be small enough to be enclosed in a package suitable for a very constrained space.) The threshold of acceptable properties has been raised considerably as drilling is undertaken at much greater depths. For example, the ability of conventional scintillator crystals to produce strong light output with high resolution can be seriously imperiled as drilling depth is increased.

It is thus clear that new scintillator materials would be very welcome in the art, if they could satisfy the ever-increasing demands for commercial and industrial use. The materials should exhibit excellent light output, as well as relatively fast decay times. They should also possess good stopping power and good energy resolution characteristics, especially in the case of gamma rays. Moreover, the new scintillators should be readily transformable into monocrystalline materials or other transparent solid bodies. Furthermore, they should be capable of being produced efficiently, at reasonable cost and acceptable crystal size. The scintillators should also be compatible with a variety of high-energy radiation detectors.

BRIEF DESCRIPTION OF THE INVENTION

In response to many of the needs discussed above, new scintillator materials have been discovered. The materials are based on certain types of halide-lanthanide matrix materials. In one embodiment, an essential feature of the matrix material is that it contains a mixture of lanthanide halides, i.e., a solid solution of at least two of the halides. The mixture usually includes a lanthanide chloride and a lanthanide bromide, but can also include lanthanum iodide. The lanthanide in the matrix is usually lanthanum itself, but can be a variety of other lanthanides. The inventors have discovered that the mixture of halides results in scintillators with greatly enhanced performance, in regard to some of the properties described above, e.g., light output.

In another embodiment, the matrix material is based on single lanthanide halide lanthanide halide is substantially free of LNOX, where Ln is a lanthanide, and X is either chloride bromide or iodide halide, or a mixture of these halides.

The scintillator materials include an activator for the matrix material. The activator can be cerium, praseodymium, or mixtures of cerium and praseodymium. These activators provide the desired luminescence to the scintillator. Typical quantities of the activators are described below.

In some embodiments, the matrix material may further comprise bismuth. The presence of bismuth can enhance various properties, like stopping power. The amount of bismuth (when present) can vary to some extent and are described below.

The scintillator composition can be prepared and used in a variety of forms. The monocrystalline form is used most often. However, it is sometimes desirable that the composition be in other forms as well, e.g., polycrystalline, or as a polycrystalline ceramic. Methods for preparing the compositions in these forms (e.g., crystal growth techniques) are also generally discussed below.

Another embodiment of the invention is directed to a radiation detector for detecting high-energy radiation, e.g., gamma rays. A primary component of the detector is the scintillator material described above, usually in single crystal form. A photodetector (e.g., a photomultiplier tube) is optically coupled to the scintillator. Since the crystals exhibit excellent and reproducible scintillation response to gamma radiation, the detector can exhibit greatly improved performance. This type of radiation detector can be incorporated into a variety of devices, as discussed below. Two very popular applications are the well-logging tools, and nuclear medicine tools, such as the positron emission tomography devices.

Another aspect of the invention thus relates to a method for detecting high-energy radiation. The method includes the use of a detector which incorporates the unique scintillator material described herein. Methods for preparing such a material are also described. Some of these methods include the growth of a single crystal from a molten mixture of the scintillator composition.

Further details regarding the various features of this invention are found in the remainder of the specification.

DETAILED DESCRIPTION OF THE INVENTION

Figure 1:
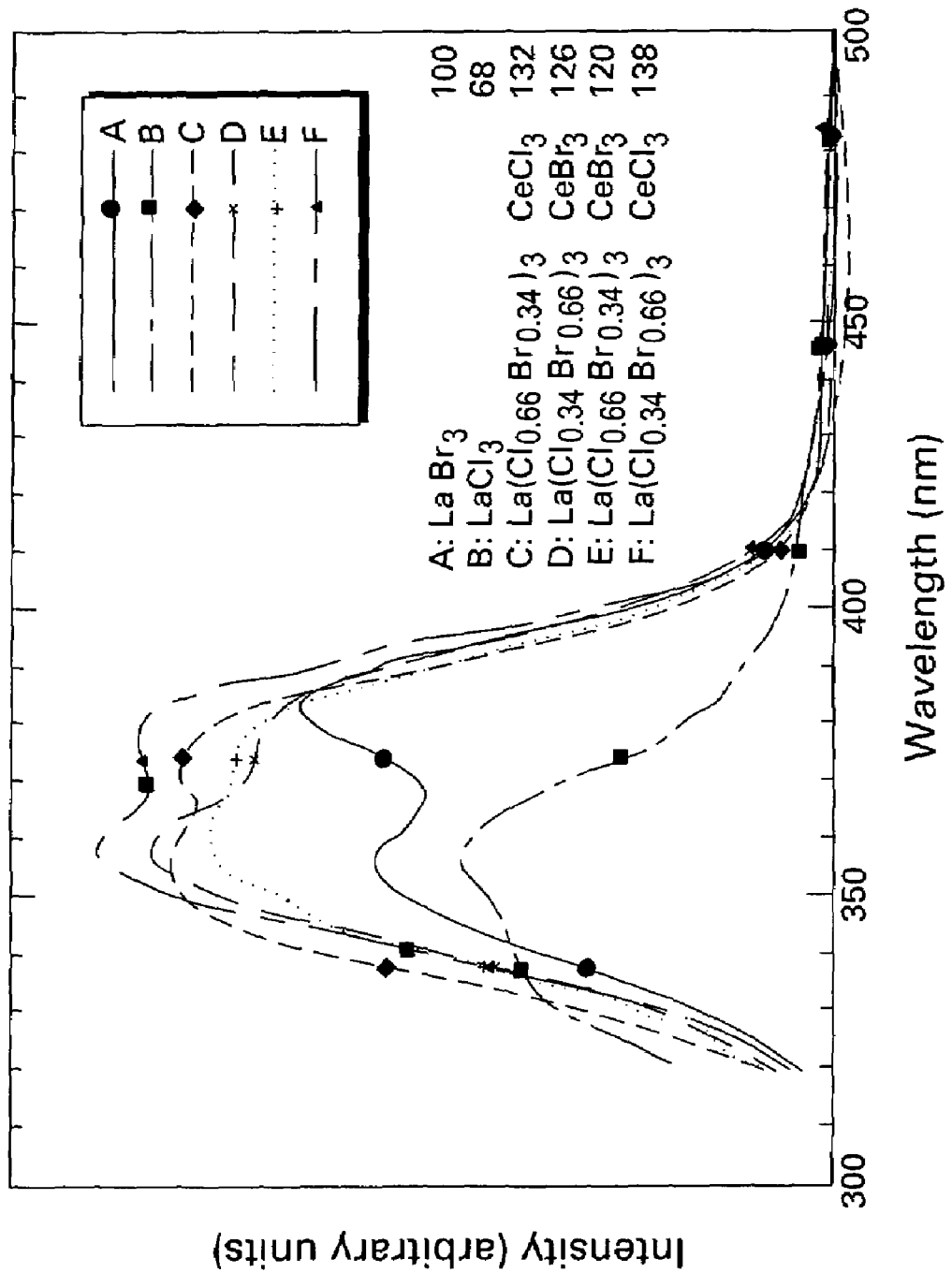
FIG. 1 is a graph of emission spectra for a set of scintillator compositions, under UV excitation.

As mentioned above, the present invention includes a halide-lanthanide matrix material. In one embodiment, the matrix material is in the form of a solid solution of at least two lanthanide halides. The halides are either bromine, chlorine, or iodine. As used herein, the term "solid solution" refers to a mixture of the halides in solid, crystalline form, which may include a single phase, or multiple phases. (Those skilled in the art understand that phase transitions may occur within a crystal after it's formation, e.g., after subsequent processing steps like sintering or densification.)

The scintillator compositions of this invention are usually described in terms of a matrix material component and an activator component. However, it should be understood that when the components are combined, they can be considered as a single, intimately-mixed composition, which still retains the attributes of activator and component. Thus, for example, an illustrative composition in which the matrix material is lanthanum bromide and the activator component is cerium bromide could be expressed by a single chemical formula, such as $(La_{99}Ce_{01})Br_3$.

The lanthanide can be any of the rare earth elements, i.e., lanthanum, cerium, praseodymium, neodymium, promethium, samarium, europium, gadolinium, terbium, dysprosium, holmium, erbium, thulium, ytterbium, and lutetium. Mixtures of two or more of the lanthanides are also possible. For the purpose of this disclosure, yttrium is also considered to be a part of the lanthanide family. (Those skilled in the art understand that yttrium is closely associated with the rare earth group.) Preferred lanthanides are selected from the group consisting of lanthanum, yttrium, gadolinium, lutetium, scandium, and mixtures thereof. In especially preferred embodiments, the lanthanide is lanthanum itself.

A variety of lanthanide halides can be used for this invention. Non-limiting examples include lutetium chloride, lutetium bromide, yttrium chloride, yttrium bromide, gadolinium chloride, gadolinium bromide, praseodymium chloride, praseodymium bromide, and mixtures thereof. However, in preferred embodiments, lanthanum halides are employed, i.e., some combination of lanthanum bromide ($LaBr_3$), lanthanum chloride ($LaCl_3$), and lanthanum iodide ($LaI_3$). These materials are known in the art and commercially available, or can be prepared by conventional techniques.

In some preferred embodiments, the solid solution is based on a mixture of lanthanum bromide and lanthanum chloride. In that instance, the ratio of the two compounds may vary considerably, i.e., a molar ratio in the range of about 1:99 to about 99:1. Very often, the molar ratio of lanthanum chloride to lanthanum bromide is in the range of about 10:90 to about 90:10. In some preferred embodiments, the molar ratio is in the range of about 30:70 to about 70:30. The specific ratio of the two compounds will depend on various factors, such as the desired properties mentioned above, e.g., light output and energy resolution.

The solid solution of lanthanum bromide and lanthanum chloride may further include lanthanum iodide. Usually, the amount of lanthanum iodide present will range from about 0.1 mole % to about 99 mole %, based on total moles of lanthanum halide present in the solid solution. In some preferred embodiments, the amount of lanthanum iodide present will range from about 1 mole % to about 50 mole %. It should also be understood that the solid solution could comprise lanthanum iodide with just one of lanthanum bromide or lanthanum chloride.

Continued addition of lanthanum iodide may eventually result in a phase transition within the solid solution. It is expected that the new phase will also have good scintillation properties. However, it may be difficult to grow single crystals from compositions which are relatively close to the "cusp" of phase transition, e.g., within about 5 mole % of lanthanum iodide. Thus, those compositions are generally less preferable for this invention, although they may be useful for some applications. (Well-known techniques can be used to determine when a phase transition occurs. For example, X-ray diffraction could be employed.)

In other preferred embodiments, the halide-lanthanide matrix material is based on the use of a single lanthanide halide. For this embodiment, the lanthanide halide should be substantially free of LNOX, where LN is a lanthanide and X is chlorine, bromine or iodine, or a mixture of these halides. As used for this particular parameter, "substantially free" is meant to indicate a compound containing less than about 0.1 mole % oxygen, and preferably, less than about 0.01 mole % oxygen. The present inventors have discovered that this type of oxygen-free lanthanide halide can be used to prepare scintillators with unexpectedly improved properties, such as high light output.

Methods for preparing oxygen-free lanthanum halide generally follow the procedures described below. However, in this instance, specific steps are taken to keep oxygen completely out of the production environment. Those skilled in the art are familiar with techniques for preparing compositions while rigorously excluding oxygen and moisture. For example, the starting materials can be loaded within a glove box having an inert atmosphere, e.g., one purged with nitrogen or argon. Such an atmosphere is usually maintained at an oxygen concentration of less than about 100 ppm, with a moisture content of less than about 3 ppm. The inert gasses can be purified by passage through a MnO oxygen-removal column. Any solvents which are used can be distilled under argon, and stored under vacuum. Other compounds can be de-gassed and also distilled under argon. In some laboratory or manufacturing facilities, flamed Schlenk-type glassware on a dual manifold Schlenk line is employed. High-vacuum (e.g., 10-5 torr) lines are often used. Moreover, a recirculator may be attached to the glove box. Those skilled in the art will be able to readily determine the most appropriate procedures and equipment for a given situation.

One exemplary illustration of the preparation of lanthanum halide can be provided. In the first step, a stoichiometric amount of ammonium iodide ($NH_4IX$ (where X is Cl, Br, I) is combined with lanthanum oxide ($La_2O_3$), at about 250° C. The resulting products are an ammonium salt of lanthanum-halide, $(NH_4)_3 [LaX_6]$, along with water and ammonia. The water and ammonia are removed from the mixture. The ammonium salt is then heated in vacuum at temperatures equal to or greater than about 300° C., to form lanthanum halide($LaX_3$) and a by-product, ammoniumhalide. The lanthanum iodide can be isolated and purified. Care is taken (e.g., excluding air and moisture), to avoid side reactions of the ammonium salt with lanthanum oxide, which would yield the undesired lanthanum oxyhalides (LaOX). Such materials can be made by other methods as well, under the general guidelines set forth herein. For example, lanthanum halides can be made by reacting lanthanum carbonate or lanthanum oxide with the corresponding halide acid, e.g., hydrochloric acid in the case of lanthanum chloride.

As mentioned above, the scintillator composition further includes an activator for the matrix material. (The activator is sometimes referred to as a "dopant".) The preferred activator is selected from the group consisting of cerium, praseodymium, and mixtures of cerium and praseodymium. In terms of luminescence efficiency and decay time, cerium is often the preferred activator. It is usually employed in its trivalent form, $Ce^{3+}$. The activator can be supplied in various forms, e.g., halides like cerium chloride or cerium bromide.

An additional dopant may be added to increase the stopping power of the scintillator composition. Lanthanide halide scintillator compositions have a low physical density relative to other commercially available scintillator compositions. For example lanthanide halide compositions have physical densities ranging from about 4 g/cc to about 5 g/cc. Other scintillator compositions, such as BGO and LSO, have physical densities ranging from about 7 g/cc to about 9 g/cc. In order to increase the physical density and stopping power of lanthanide halide compositions crystal sizes for such compositions may be larger thereby increasing the thickness of a scintillating layer on a detector. Increasing the size of crystals, and/or the thickness of the scintillator layer, may adversely affect the efficiency of the scintillating composition at least in terms of light output.

With respect to the present invention, it has been found that doping a cerium activated lanthanide halide scintillator composition with bismuth will increase the efficiency of the scintillator composition. The high atomic number of bismuth relative to other dopants may improve the stopping power of the crystals. Accordingly, bismuth may be added to the composition in order to increase the overall physical density and stopping power of the compostion.

The amount of activator and bismuth present will depend on various factors, such as the particular halide-lanthanide matrix being used; the desired emission properties and decay time; and the type of detection device into which the scintillator is being incorporated. Usually, the activator is employed at a level in the range of about 0.1 mole % to about 20 mole %, based on total moles of activator and halide-lanthanide matrix material. Typically, the bismuth is employed at a level in the range of about 0.1 mole % to about 20 mole %. In many preferred embodiments, the amount of activator and bismuth is in the range of about 1 mole % to about 10 mole % each.

The composition of this invention may be prepared in several different forms. In some preferred embodiments, the composition is in monocrystalline (i.e., "single crystal") form. Monocrystalline scintillation crystals have a greater tendency for transparency. They are especially useful for high-energy radiation detectors, e.g., those used for gamma rays.

However, the composition can be in other forms as well, depending on its intended end use. For example, it can be in powder form. It can also be prepared in the form of a polycrystalline ceramic. It should also be understood that the scintillator compositions may contain small amounts of impurities, as described in the previously-referenced publications, WO 01/60944 A2 and WO 01/60945 A2 (incorporated herein by reference). These impurities usually originate with the starting materials, and typically constitute less than about 0.1% by weight of the scintillator composition. Very often, they constitute less than about 0.01% by weight of the composition. The composition may also include parasite phases, whose volume percentage is usually less than about 1%. Moreover, minor amounts of other materials may be purposefully included in the scintillator compositions, as taught in U.S. Pat. No. 6,585,913 (Lyons et al), which is incorporated herein by reference. For example, praseodymium oxide and/or terbium oxide can be added to reduce afterglow. Calcium and/or dysprosium can be added to reduce the likelihood of radiation damage.

Methods for preparing the scintillator materials are generally known in the art. The compositions can usually be prepared by wet or dry processes. (It should be understood that the scintillator compositions may contain a variety of reaction products of these processes). Some exemplary techniques for preparing the polycrystalline materials are described in the above-mentioned Lyons patent, as well as in U.S. Pat. No. 5,213,712 (Dole), and U.S. Pat. No. 5,882,547 (Lynch et al), which are incorporated herein by reference. Usually, a suitable powder containing the desired materials in the correct proportions is first prepared, followed by such operations as calcination, die forming, sintering, and/or hot isostatic pressing. The powder can be prepared by mixing various forms of the reactants (e.g., salts, oxides, halides, oxalates, carbonates, nitrates, or mixtures thereof). Mixing can be carried out in the presence of a liquid such as water, an alcohol, or a hydrocarbon.

In one illustrative dry process, the appropriate reactants are usually supplied in powder form. For example, one or more lanthanide-containing reactants can be mixed with one or more halide-containing reactants, and at least one activator-containing reactant. (At least two halide-containing reactants are used if at least two lanthanide halides are required, as described previously). The lanthanide reactants and the activator reactants are often oxygen-containing compounds, e.g., oxides, nitrates, acetates, oxalates, sulfates, phosphates, or combinations of any of the foregoing. Under specified conditions, many of these compounds decompose to a form of the desired compounds, e.g., oxides of lanthanum and cerium. A calcining step is sometimes required to obtain the corresponding oxides. In some preferred embodiments, the lanthanide and the halide are supplied as a single reactant, e.g., a lanthanum halide like lanthanum chloride.

The mixing of the reactants can be carried out by any suitable means which ensures thorough, uniform blending. For example, mixing can be carried out in an agate mortar and pestle. Alternatively, a blender or pulverization apparatus can be used, such as a ball mill, a bowl mill, a hammer mill, or a jet mill. The mixture can also contain various additives, such as fluxing compounds and binders. Depending on compatibility and/or solubility, water, heptane, or an alcohol such as ethyl alcohol can sometimes be used as a liquid vehicle during milling. Suitable milling media should be used, e.g., material that would not be contaminating to the scintillator, since such contamination could reduce its light-emitting capability.

After being blended, the mixture is fired under temperature and time conditions sufficient to convert the mixture into a solid solution. These conditions will depend in part on the specific type of matrix material and activator being used. Usually, firing will be carried out in a furnace, at a temperature in the range of about 500° C. to about 1100° C. A preferred range is about 600° C. to about 800° C. The firing time will typically range from about 15 minutes to about 10 hours.

Firing may be carried out in an oxygen-containing, inert or reducing atmosphere. Examples include air, oxygen, or a mixture of oxygen and an inert gas, such as nitrogen, helium, neon, argon, krypton, and xenon; or, one of these listed inert gases or a combination of two or more inert gases. However, in some preferred embodiments (e.g., when the halide is oxygen-free lanthanum iodide), firing is carried out in an oxygen-free atmosphere, as described above. After firing is complete, the resulting material can be pulverized, to put the scintillator into powder form. Conventional techniques can then be used to process the powder into radiation detector elements.

Methods for making the single crystal materials are also well-known in the art. A non-limiting, exemplary reference is "Luminescent Materials", by G. Blasse et al, Springer-Verlag (1994). Usually, the appropriate reactants are melted at a temperature sufficient to form a congruent, molten composition. The melting temperature will depend on the identity of the reactants themselves, but is usually in the range of about 650° C. to about 1050° C. In the case of lanthanum halides with a cerium-based activator, the melting temperature is typically in the range of about 750° C. to about 950° C.

In most embodiments where a single crystal is desired, the crystal is formed from the molten composition by a suitable technique. A variety of techniques can be employed. They are described in many references, such as U.S. Pat. No. 6,437,336 (Pauwels et al); "Crystal Growth Processes", by J. C. Brice, Blackie & Son Ltd (1986); and the "Encyclopedia Americana", Volume 8, Grolier Incorporated (1981), pages 286-293. These descriptions are incorporated herein by reference. Non-limiting examples of the crystal-growing techniques are the Bridgman-Stockbarger method; the Czochralski method, the zone-melting method (or "floating zone" method), and the temperature gradient method. Those skilled in the art are familiar with the necessary details regarding each of these processes.

One non-limiting illustration can be provided for producing a scintillator in single crystal form, based in part on the teachings of the Lyons et al. patent mentioned above. In this method, a seed crystal of the desired composition (described above) is introduced into a saturated solution. The solution is contained in a suitable crucible, and contains appropriate precursors for the scintillator material. The new crystalline material is allowed to grow and add to the single crystal, using one of the growing techniques mentioned above. The size of the crystal will depend in part on its desired end use, e.g., the type of radiation detector in which it will be incorporated.

Methods for preparing the scintillator material in other forms are also known in the art. For example, in the case of the polycrystalline ceramic form mentioned above, the scintillator material is first produced in powder form (or converted to powder form), as described previously. The material is then sintered to transparency by conventional techniques (e.g., in a furnace), at a temperature which is typically about 65% to 85% of the melting point of the powder. The sintering can be carried out under atmospheric conditions, or under pressure.

Yet another embodiment of the invention is directed to a method for detecting high-energy radiation with a scintillation detector. The detector includes one or more crystals, formed from the scintillator composition described herein. Scintillation detectors are well-known in the art, and need not be described in detail here. Several references (of many) which discuss such devices are U.S. Pat. Nos. 6,585,913 and 6,437,336, mentioned above, and U.S. Pat. No. 6,624,420 (Chai et al), which is also incorporated herein by reference. In general, the scintillator crystals in these devices receive radiation from a source being investigated, and produce photons which are characteristic of the radiation. The photons are detected with some type of photodetector. (The photodetector is connected to the scintillator crystal by conventional electronic and mechanical attachment systems).

As mentioned above, the photodetector can be a variety of devices, all well-known in the art. Non-limiting examples include photomultiplier tubes, photodiodes, CCD sensors, and image intensifiers. Choice of a particular photodetector will depend in part on the type of radiation detector being fabricated, and on its intended use.

The radiation detectors themselves, which include the scintillator and the photodetector, can be connected to a variety of tools and devices, as mentioned previously. Non-limiting examples include well-logging tools and nuclear medicine devices (e.g., PET). The radiation detectors may also be connected to digital imaging equipment, e.g., pixilated flat panel devices. Moreover, the scintillator may serve as a component of a screen scintillator. For example, powdered scintillator material could be formed into a relatively flat plate which is attached to a film, e.g., photographic film. High energy radiation, e.g., X-rays, originating from some source, would contact the scintillator and be converted into light photons which are developed on the film.

Several of the preferred end use applications should also be briefly discussed. Well-logging devices were mentioned previously, and represent an important application for these radiation detectors. The technology for operably connecting the radiation detector to a well-logging tube is well-known in the art. The general concepts are described in U.S. Pat. No. 5,869,836 (Linden et al), which is incorporated herein by reference. The crystal package containing the scintillator usually includes an optical window at one end of the enclosure-casing. The window permits radiation-induced scintillation light to pass out of the crystal package for measurement by the light-sensing device (e.g., the photomultiplier tube), which is coupled to the package. The light-sensing device converts the light photons emitted from the crystal into electrical pulses that are shaped and digitized by the associated electronics. By this general process, gamma rays can be detected, which in turn provides an analysis of the rock strata surrounding the drilling bore holes.

Medical imaging equipment, such as the PET devices mentioned above, represent another important application for these radiation detectors. The technology for operably connecting the radiation detector (containing the scintillator) to a PET device is also well-known in the art. The general concepts are described in many references, such as U.S. Pat. No. 6,624,422 (Williams et al), incorporated herein by reference. In brief, a radiopharmaceutical is usually injected into a patient, and becomes concentrated within an organ of interest. Radionuclides from the compound decay and emit positrons. When the positrons encounter electrons, they are annihilated and converted into photons, or gamma rays. The PET scanner can locate these "annihilations" in three dimensions, and thereby reconstruct the shape of the organ of interest for observation. The detector modules in the scanner usually include a number of "detector blocks", along with the associated circuitry. Each detector block may contain an array of the scintillator crystals, in a specified arrangement, along with photomultiplier tubes.

In both the well-logging and PET technologies, the light output of the scintillator is critical. The present invention provides scintillator materials which can provide the desired light output for demanding applications of the technologies. Moreover, the crystals can simultaneously exhibit the other important properties noted above, e.g., fast decay time, reduced afterglow, high "stopping power", and acceptable energy resolution. Furthermore, the scintillator materials can be manufactured economically, and can also be employed in a variety of other devices which require radiation detection.

EXAMPLE 1

The example which follows is merely illustrative, and should not be construed to be any sort of limitation on the scope of the claimed invention.

Six scintillator samples were examined for light output analysis. Sample A was lanthanum bromide ($LaBr_3$), obtained from a commercial source. Sample B was lanthanum chloride ($LaCl_3$), obtained in the same manner. Each of these samples served as controls.

Sample C was a composition within the scope of the present invention. The composition was a cerium-activated solid solution of lanthanum chloride and lanthanum bromide. The composition was prepared by dry mixing cerium chloride with lanthanum chloride and lanthanum bromide. (All materials were commercially-obtained.) Mixing was carried out in an agate mortar and pestle. The uniform mixture was then transferred to an aluminum crucible, and fired at a temperature of about 600° C. The heating atmosphere was a mixture of 0.5% hydrogen and 99.5% nitrogen. The final molar ratio of lanthanum chloride to lanthanum bromide was 66:34. (Starting material levels were adjusted to maintain the desired proportion of halides.)

Sample D was another composition within the scope of the present invention. The sample was prepared in the same manner as sample C, although cerium bromide was used as the activator, rather than cerium chloride. In this instance, the final molar ratio of lanthanum chloride to lanthanum bromide was 34:66.

Sample E was substantially identical to sample C, but cerium bromide was employed as the activator, rather than cerium chloride. Sample F was substantially identical to sample D, but cerium chloride was employed as the activator, rather than cerium bromide. Samples E and F were also within the scope of the claimed invention.

Table 1 shows the observed light output for each scintillator material, in relative percent. The selected standard is comparative sample A, with a light output of 100%.

TABLE 1

| SAMPLE | COMPOSITION | ACTIVATOR | LIGHT OUTPUT* |
|---|---|---|---|
| A** | $LaBr_3$ | — | 100 |
| B** | $LaCl_3$ | — | 68 |
| C | $La(Cl_{0.66}Br_{0.34})_3$ | $CeCl_3$ | 132 |
| D | $La(Cl_{0.34}Br_{0.66})_3$ | $CeBr_3$ | 126 |
| E | $La(Cl_{0.66}Br_{0.34})_3$ | $CeBr_3$ | 120 |
| F | $La(Cl_{0.34}Br_{0.66})_3$ | $CeCl_3$ | 138 |

*Relative percent for samples B-F, as compared to sample A.
**Comparative samples.

The data of Table 1 are also depicted graphically in FIG. 1, which is a plot of wavelength (nm) as a function of intensity (arbitrary units). The excitation wavelength was about 300 nm. The data show that each of the samples which were based on the solid solution (C, D, E, F) had light output values which were much higher than those of either samples A or B. The improvement in light output was apparent in different proportions of each halide. The improvement was also generally maintained when the different cerium activator compounds were utilized.

EXAMPLE 2

The example which follows is merely illustrative, and should not be construed to be any sort of limitation on the scope of the claimed invention.

Five scintillator samples were examined for light output analysis. Sample A was lanthanum bromide ($LaBr_3$), obtained from a commercial source. This sample served as a control. It is noted that while the control sample A, and the below described samples B, C, D and E did not include other lanthanide halides, or activators other than cerium, the invention encompasses any of the above described scintillator compositions with the addition of bismuth or other elements or compounds that may enhance the efficiency of the scintillator composition.

Sample B was a composition within the scope of the present invention. The composition was a cerium-activated and bismuth-doped solid solution of lanthanum bromide. The composition was prepared by dry mixing cerium bromide and bismuth bromide with lanthanum bromide. (All materials were commercially obtained.) Mixing was carried out in an agate mortar and pestle. The uniform mixture was then transferred to silver tube which was subsequently sealed, and fired at a temperature of about 800° C. The heating atmosphere was pure nitrogen. The final molar ratio of lanthanum bromide to cerium bromide and bismuth bromide was 98:1:1. (Starting material levels were adjusted to maintain the desired proportion of halides.)

Sample C, D and E were compositions within the scope of the present invention, and included the same three above-identified compounds lanthanum bromide, cerium bromide as an activator and bismuth bromide at different molar ratios. The samples were prepared in the same manner as sample B. In the instance of Sample C, the final molar ratio of lanthanum bromide to cerium bromide and bismuth bromide was 96:1:3. Sample D contained a final molar ratio of lanthanum bromide to cerium bromide and bismuth bromide was 94:1:5. Sample E contained a final molar ratio of lanthanum bromide to cerium bromide and bismuth bromide was 89:1:10.

Table 2 shows the observed light output for each scintillator material, in relative percent. The selected standard is comparative sample A, with a light output of 100%.

TABLE 2

| SAMPLE | COMPOSITION | LIGHT OUTPUT* |
|---|---|---|
| A** | $(La_{99}Ce_{01})Br_3$ | 100 |
| B | $(La_{99}Ce_{01}Bi_{01})Br_3$ | 117 |
| C | $(La_{96}Ce_{01}Bi_{03})Br_3$ | 168 |
| D | $(La_{94}Ce_{01}Bi_{05})Br_3$ | 154 |
| E | $(La_{89}Ce_{01}Bi_{10})Br_3$ | 221 |

*Relative percent for samples B-E, as compared to sample A.
**Comparative samples.

Figure 2:
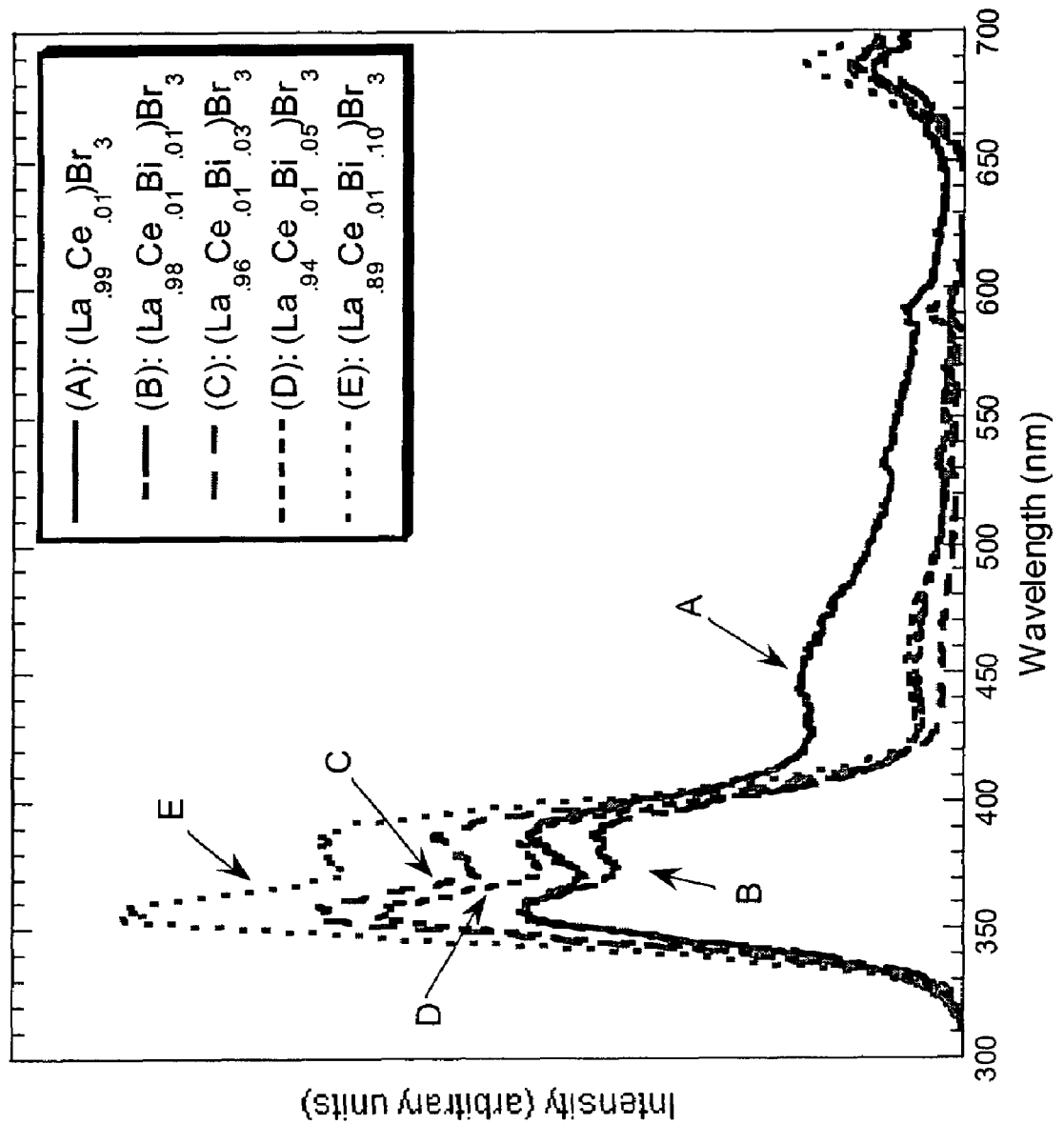
FIG. 2 is a graph of emission spectra for a set of scintillator compositions, under X-ray excitation.

The data of Table 2 is also depicted graphically in FIG. 2, which is a plot of wavelength (nm) as a function of intensity (arbitrary units). The samples were excited by X-rays. The data show that each samples B, C, D and E that were doped with bismuth had light output values which were comparable to or in most cases higher than than the standard control that did not include bismuth. The data also shows that increased amounts of bismuth in the cerium activated scintillator composition resulted in higher light output values. The improvement, or at least maintaining a comparable light output, was also generally maintained when the different halide compounds were utilized.

With respect to the present invention, the addition of bismuth to the scintallor matrix should increase the overall physical density of the scintillator. By increasing the density of the composition the stopping power, or ability to absorb radiation, may be improved. Having a higher physical density also translates into utilizing smaller crystals in the scintillating matrix, which translates into reducing the thickness of a scintillating layer or matrix on a detection device. Accordingly, the bismuth may improve the scintillating efficiency of the scintillator composition.

This invention has been described according to specific embodiments and examples. However, various modifications, adaptations, and alternatives may occur to one skilled in the art without departing from the spirit and scope of the claimed inventive concept. All of the patents, articles, and texts which are mentioned above are incorporated herein by reference.

What is claimed:

1. A scintillator composition, comprising the following, and reaction products thereof:
   (a) a matrix material comprising one or more lanthanide halides;
   (b) an activator for the matrix material, comprising an element selected from the group consisting of cerium, praseodymium, and mixtures of cerium and praseodymium; and,
   (c) bismuth wherein the molar ratio of the lanthanide halide, the activator and bismuth is in the range of about 98:1:1 to about 1:1:98.

2. The scintillator composition of claim 1 wherein the molar ratio of the lanthanide halide, the activator and bismuth is in the range of about 98:1:1 to about 89:1:10.

3. The scintillator composition of claim 1 wherein the halide-lanthanide matrix material is selected from the group consisting of (i) a solid solution of at least two lanthanide halides, and (ii) lanthanum iodide, substantially free of oxygen.

4. The scintillator composition of claim 3, wherein the lanthanide halides of component (i) are selected from the group consisting of lanthanum bromide, lanthanum chloride, lanthanum iodide, lutetium chloride, lutetium bromide, yttrium chloride, yttrium bromide, gadolinium chloride, gadolinium bromide, praseodymium chloride, praseodymium bromide, and mixtures thereof.

5. The scintillator composition of claim 3, wherein the solid solution comprises lanthanum chloride and lanthanum bromide.

6. The scintillator composition of claim 5, wherein the molar ratio of lanthanum chloride to lanthanum bromide is in the range of about 1:99 to about 99:1.

7. The scintillator composition of claim 6, wherein the molar ratio of lanthanum chloride to lanthanum bromide is in the range of about 10:90 to about 90:10.

8. The scintillator composition of claim 3, wherein the solid solution further comprises lanthanum iodide.

9. The scintillator composition of claim 8, wherein the amount of lanthanum iodide present is in the range of about 0.1 mole % to about 99 mole %, based on total moles of lanthanide halide present in the solid solution.

10. The scintillator composition of claim 9, wherein the amount of lanthanum iodide present is in the range of about 1 mole % to about 50 mole %.

11. The scintillator composition of claim 3, wherein the solid solution comprises lanthanum iodide and one of lanthanum chloride or lanthanum bromide.

12. The scintillator composition of claim 1, wherein the halide in the matrix material is selected from the group consisting of bromine, chlorine, iodine, and combinations thereof.

13. The scintillator composition of claim 1, wherein the lanthanide in the matrix material is selected from the group consisting of lanthanum, yttrium, gadolinium, lutetium, scandium, and mixtures thereof.

14. The scintillator composition of claim 1, wherein the lanthanide in the matrix material is lanthanum.

15. The scintillator composition of claim 1, wherein the activator is present at a level in the range of about 0.1 mole % to about 20 mole %, based on total moles of activator and halide-lanthanide matrix material.

16. The scintillator composition of claim 15, wherein the activator is present at a level in the range of about 1 mole % to about 10 mole %.

17. The scintillator composition of claim 15, wherein the activator comprises cerium.

18. The scintillator composition of claim 1, in substantially monocrystalline form.

19. The scintillator composition of claim 1, in polycrystalline form.

20. The scintillator composition of claim 1, in the form of a polycrystalline ceramic material.

21. The scintillator composition of claim 1, in the form of a film.

22. The scintillator composition of claim 1, wherein the bismuth is present at a level in the range of about 0.1 mole % to about 20 mole %, based on total moles of bismuth and the halide-lanthanide matrix material.

23. The scintillator composition of claim 22, wherein the bismuth is present at a level in the range of about 1 mole % to about 10 mole %.

24. The scintillator composition of claim 22, wherein the activator comprises cerium.

25. A cerium-doped and bismuth-doped scintillator composition, comprising a mixture of at least two lanthanide halides wherein the molar ratio of the lanthanide halides, cerium and bismuth is in the range of about 98:1:1 to about 1:1:98.

26. The scintillator composition of claim 25, wherein the lanthanide halide mixture comprises lanthanum chloride and lanthanum bromide, in a molar ratio in the range of about 10:90 to about 90:10.

27. A cerium-doped and bismuth-doped scintillator composition, comprising lanthanum iodide, substantially free of lanthanum oxyiodide wherein the molar ratio of the lanthanide iodide, cerium and bismuth is in the range of about 98:1:1 to about 1:1:98.

28. The scintillator composition of claim 27, wherein cerium is present at a level in the range of about 1 mole % to about 10 mole %, based on total moles of cerium and lanthanum iodide.

29. The scintillator composition of claim 27, wherein bismuth is present at a level in the range of about 1 mole % to about 10 mole %, based on total moles of cerium and lanthanum iodide.

30. A radiation detector for detecting high-energy radiation, comprising:
  (a) a crystal scintillator which comprises the following composition, and any reaction products thereof:
    (i) a halide-lanthanide matrix material;
    (ii) an activator for the matrix material, comprising an element selected from the group consisting of cerium, praseodymium, and mixtures of cerium and praseodymium;
    (iii) bismuth wherein the molar ratio of the halide-lanthanide, the activator and bismuth is in the range of about 98:1:1 to about 1:1:98; and
  (b) a photodetector optically coupled to the scintillator, so as to be capable of producing an electrical signal in response to the emission of a light pulse produced by the scintillator.

31. The radiation detector of claim 30, wherein the lanthanide in the matrix material of the scintillator is lanthanum.

32. The radiation detector of claim 30 wherein the halide-lanthanide matrix material is selected from the group consisting of (i) a solid solution of at least two lanthanide halides, and (ii) a lanthanide halide that is substantially free of oxygen.

33. The radiation detector of claim 30, wherein the solid solution of the matrix material of the scintillator comprises lanthanum chloride and lanthanum bromide.

34. The radiation detector of claim 33, wherein the solid solution further comprises lanthanum iodide.

35. The radiation detector of claim 30, wherein the photodetector is at least one device selected from the group consisting of a photomultiplier tube, a photodiode, a CCD sensor, and an image intensifier.

36. The radiation detector of claim 30, operably connected to a well-logging tool.

37. The radiation detector of claim 36, wherein the nuclear medicine apparatus comprises a positron emission tomography (PET) device.

38. The radiation detector of claim 30, operably connected to a nuclear medicine apparatus.

39. The radiation detector of claim 30, operably connected to a digital imaging device.

40. The radiation detector of claim 30, operably connected to a screen scintillator.

41. A method for detecting high-energy radiation with a scintillation detector, comprising the steps of:

(a) receiving radiation by an activated, halide-lanthanide-based scintillator crystal, so as to produce photons which are characteristic of the radiation; and
(b) detecting the photons with a photon detector coupled to the scintillator crystal;
  (i) a halide-lanthanide matrix material;
  (ii) an activator for the matrix material, comprising an element selected from the group consisting of cerium, praseodymium, and mixtures of cerium and praseodymium; and,
  (iii) bismuth wherein the molar ratio of the halide-lanthanide, activator and bismuth is in the range of about 98:1:1 to about 1:1:98.

42. A method for detecting high-energy radiation of claim 41 wherein the halide-lanthanide matrix material is selected from the group consisting of (i) a solid solution of at least two lanthanide halides, and (ii) a lanthanide halide that is substantially free of oxygen.

43. A scintillator composition, comprising the following, and reaction products thereof:
  (a) a matrix material comprising one or more lanthanide halides;
  (b) an activator for the matrix material, comprising an element selected from the group consisting of cerium, praseodymium, and mixtures of cerium and praseodymium; and,
  (c) bismuth wherein the molar ratio of the lanthanide halide, the activator and bismuth is in the range of about 98:1:1 to about 1:98:1.

44. The scintillator composition of claim 43 wherein the molar ratio of the lanthanide halide, the activator and bismuth is in the range of about 98:1:1 to about 1:89:10.

\* \* \* \* \*